United States Patent [19]

Bolosky et al.

[11] Patent Number: 5,699,503

[45] Date of Patent: Dec. 16, 1997

[54] METHOD AND SYSTEM FOR PROVIDING FAULT TOLERANCE TO A CONTINUOUS MEDIA SERVER SYSTEM

[75] Inventors: William J. Bolosky, Issaquah; Robert P. Fitzgerald, Redmond; Lawrence W. Osterman, Woodinville, all of Wash.

[73] Assignee: Microsoft Corporation, Redmond, Wash.

[21] Appl. No.: 705,075

[22] Filed: Aug. 26, 1996

Related U.S. Application Data

[63] Continuation of Ser. No. 437,935, May 9, 1995, abandoned.

[51] Int. Cl.$^6$ .................................................. G06F 11/00
[52] U.S. Cl. ................................................... 395/182.04
[58] Field of Search ........................ 395/182.02, 182.03, 395/182.04, 182.06, 182.05; 348/7, 12, 11, 13, 5; 455/4.2, 5.1

[56] References Cited

U.S. PATENT DOCUMENTS

| | | | |
|---|---|---|---|
| 3,771,143 | 11/1973 | Taylor . | |
| 4,959,774 | 9/1990 | Davis | 395/575 |
| 5,271,012 | 12/1993 | Blaum et al. | 371/10.1 |
| 5,333,305 | 7/1994 | Neufeld | 395/575 |
| 5,357,509 | 10/1994 | Ohizumi | 371/10.1 |
| 5,392,244 | 2/1995 | Jacobson et al. | 365/200 |
| 5,414,455 | 5/1995 | Hooper et al. | 348/7 |
| 5,422,674 | 6/1995 | Hooper et al. | 348/409 |
| 5,440,336 | 8/1995 | Buhro et al. | 348/13 |
| 5,442,390 | 8/1995 | Hooper et al. | 348/7 |
| 5,473,362 | 12/1995 | Fitzgerald et al. | 348/7 |
| 5,559,764 | 9/1996 | Chen et al. | 369/30 |
| 5,606,359 | 2/1997 | Youden et al. | 348/7 |

OTHER PUBLICATIONS

Chen et al., RAID: High–Performance, Reliable Secondary Storage, ACM Computing Surveys, Jun. 1994, at 145.

Reddy & Banerjee, An Evaluation of Multiple–Disk I/O Systems, IEEE Transactions on Computers, Dec. 1989, ay 1680.

Nexis search (of articles listing the announcement of Microsoft's Tiger media server. Search performed Aug. 17, 1995.

Soat, Driving Microsoft, InformationWEEK, May 1994, at 100.

Derwent Research Disclosure RD 345097 (Anonymous), Dual Striping Method for Replicated Data Disc Array, Jan. 10, 1993.

Hsiao & DeWitt, A persofrmance Study of Three High Availabiltiy Data Replication Strategies, 1991 Parallel and Distributed Information Systems Intl. Conf., at 18.

Golubchik et al., Chained Declustering: Load Balancing and Rubustness to Skew and Failures, Research Issues in Data Engineering 1992 Workshop, at 88.

(List continued on next page.)

*Primary Examiner*—Robert W. Beausoliel, Jr.
*Assistant Examiner*—Norman M. Wright
*Attorney, Agent, or Firm*—Seed and Berry LLP

[57] ABSTRACT

A method and system is provided for tolerating component failure in a continuous media server system. The present invention guarantees data streams at a constant rate to subscribers for the data streams even when at least one component fails. The present invention is able to guarantee data streams at a constant rate by utilizing declustered mirroring and by reserving bandwidth for both normal mode processing and failure mode processing. The declustered mirroring of the present invention is performed by dividing the data to be stored in the continuous media server system into blocks. The blocks are then striped across the storage devices of the continuous media server system and each block is divided into a number of sub-blocks. The sub-blocks are in turn stored on separate storage devices. The present invention reserves bandwidth for both normal mode processing and failure mode processing. Since the present invention utilizes declustered mirroring, the bandwidth reserved for failure mode processing is reduced. Therefore, when a failure occurs, the bandwidth reserved for failure mode processing is utilized and the data streams to the subscribers are uninterrupted.

23 Claims, 10 Drawing Sheets

OTHER PUBLICATIONS

Catania et al., Performance Evaluation of a partial Dynamic Declustering Disk Array System, 1994 High Performance Distributed Computing Intl. Symp., at 224.

Mace, Oracle Media Server Widely Endorsed, InfoWorld, Feb. 21, 1994, at 20.

Li et al., Combining Replication and Parity Approaches for Fault–Tolerant Disk Arrays, 1994 Parallel & Distributed Processing Symposium, at 360.

Buck, The Oracle Media Server for nCUBE Massively Parallel Systems, 1994 Parallel Processing Symposium, at 670.

Vina et al., Real–Time Multimedia Systems, 13th IEEE Symposium on Mass Storage (1994), at 77.

Kovalick, The Video Server as a Component in Interactive Broadband Delivery Systems, 1994 Community Networking Intergrated Multimedia Service Wrkshp, at 77.

Kenchammana–Hosekote & Srivastava, Scheduling Continious Media in a Video–On–Demand Server, 1994 International Multimedia Conference, at 19.

Gibson, Garth A., et al., *Failure Correction Techniques for Large Disk Arrays*, APLOS III, Apr. 1989, Boston, MA, pp. 123–132.

Patterson, David A. et al., *A Case for Redundant Arrays of Inexpensive Disks (RAID)*, ACM SIGMOD Conference Proceedings, Chicago, IL, Jun. 1–3, 1988, pp. 109–116.

Bitton, Dina and Jim Gray, *Disk Shadowing*, Proceedings of the 14$^{th}$ VLDB Conference, Los Angeles, CA 1988, pp. 331–338.

Chen, Peter M., et al., *An Evaluation of Redundant Arrays of Disks using an Amdahl 5890*, Proceedings of the ACM SIGMETRICS Conference, 1990, pp. 74–85.

Copeland, George and Tom Keller, *A Comparison of High–Availability Media Recovery Techniques*, Proceedings of the ACM SIGMOD Conference, 1989, pp. 98–109.

Gray, Jim et al., *Parity Striping of Disc Arrays: Low–Cost Reliable Storage with Acceptable Throughput*, Proceedings of the 16$^{th}$ Conference on Very Large Data Bases, Brisbane, AU, 1990, pp. 148–161.

Muntz, Richard R. and John C.S. Lui, *Performance Analysis of Disk Arrays Under Failure*, Proceedings of the 16$^{th}$ VLDB Conference, Brisbane, AU, 1990, pp. 162–173.

Chen, Peter M. and David A. Patterson, *Maximizing Performance in a Striped Disk Array*, Proceedings of the ACM SIGARCH Conference, 1990, pp. 322–331.

*How RAID Works*, Computerworld, Mar. 14, 1994, v28, n11, pp. 92–97.

Hsiao, Hui–I and David J. DeWitt, *Chained Declustering: A New Availability Strategy for Multiprocessor Database Machines*, Proceedings of the 6$^{th}$ International Data Engineering Conference, Los Angeles, CA, 1990, pp. 456–465.

Kliewer, Bradley Dyck, *Raid To The Rescue*, Varbusiness, Fall 1992, pp. 39–42.

Simpson, David, *Balancing RAID delivery*, Digital News & Reviews, Dec. 20, 1993, pp. 43–48.

Marson, Carolyn Duffy, *RAID—New storage devices take feds by storm*, Federal Computer Week, Sep. 14, 1992, pp. 16–18.

McBride, John, *Getting the most out of redundant arrays of inexpensive disks*, EDN, Feb. 4, 1993, pp. 109–114.

Bates, Ken, *RAID: a new balance of power*, DEC Professional, Jan. 1994, v13 n1 p34(5).

Pavlinik, Ed, *RAID: use as directed*, HP Professional, Aug. 1993, v7 n8 p30(4).

Holland, Mark and Garth A. Gibson, *Parity Declustering for Continuous Operation in Redundant Disk Arrays* ASPLOS V–10/92MA, USA.

Patterson, David A. et al., *Introduction to Redundant Arrays of Inexpensive Disks (RAID)*, Computer Science Division, Department of Electrical and Computer Science, University of California, Berkeley, CA, 1989.

Matloff, Norman S. and Raymond Wai–man Lo, *A "Greedy" Approach to the Write Problem in Shadowed Disk Systems*, Sixth International Conference on Data Engineering, Feb. 5–9, 1990, pp. 553–558.

*The RAIDbook–A Source Book for Disk Array Technology*, Raid Advisory Board, St. Peter, MN, Sep. 1, 1994, Chapters 1, 3, 4, 6 and 7.

Holland, Mark Calvin, *On–Line Data Reconstruction In Redundant Disk Arrays*, a dissertation submitted to the Department of Electrical and Computer Engineering, Carnegie Mellon University, in partial fulfillment of the requirements for the degree of Doctor Philosophy, 1994.

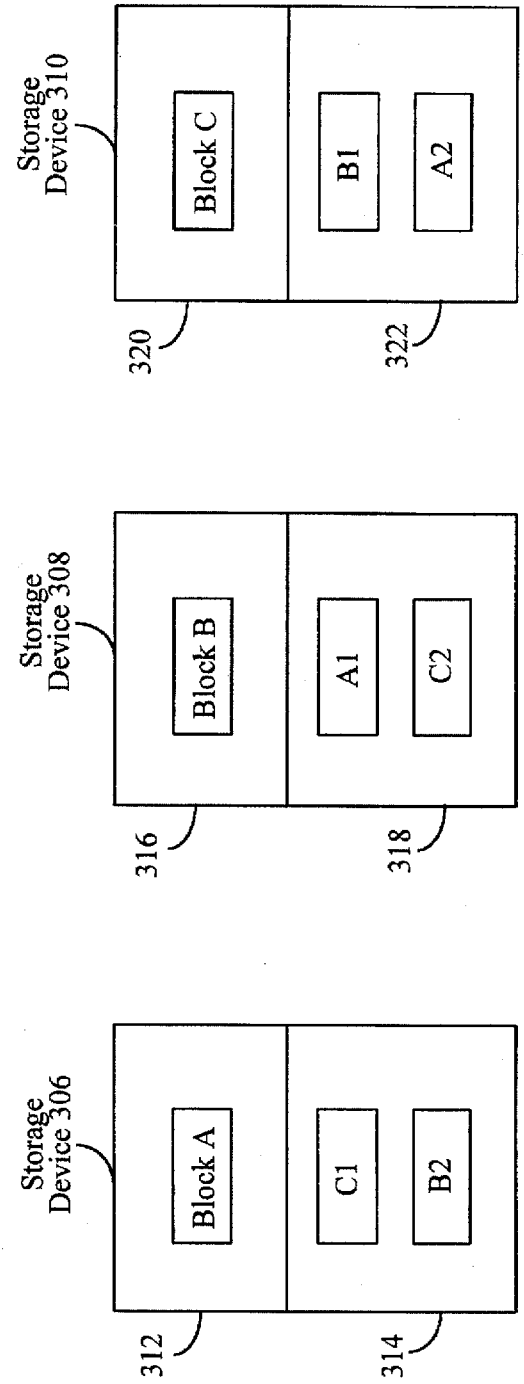
FIG. 3A  FIG. 3B  FIG. 3C

METHOD AND SYSTEM FOR PROVIDING FAULT TOLERANCE TO A CONTINUOUS MEDIA SERVER SYSTEM

CROSS-REFERENCE TO RELATED APPLICATION

This application is a continuation of U.S. patent application Ser. No. 08/437,935, filed May 9, 1995, now abandoned.

TECHNICAL FIELD

The present invention relates generally to data processing systems and, more particularly, to fault tolerance in a continuous media server system.

BACKGROUND OF THE INVENTION

Some conventional data processing systems use a technique known as "mirroring" in order to continue operating when a storage device fails. Mirroring refers to a technique where for every storage device ("primary storage device") in a data processing system, the data processing system maintains a mirror storage device. The mirror storage device is a storage device that contains a duplicate copy of the data on the primary storage device. Whenever an operation is performed on the primary storage device that would alter the data contained thereon (e.g., write), the same operation is performed on the mirror storage device. Thus, at any given time, the mirror storage device has an exact duplicate copy of all the data on the primary storage device.

Since the mirror storage device has an exact duplicate copy of all the data on the primary storage device, if the primary storage device fails, the data processing system switches to use the mirror storage device and the operation of the data processing system continues with little interruption. Although mirroring provides for a more reliable data processing system, the mirroring technique is not suitable for all types of data processing systems since there must be a duplicate of every storage device on the system and since some interruption of the data processing system typically occurs.

One example of a data processing system where an interruption would not be acceptable, even for a short period of time, is a continuous media server system. A continuous media server system is a data processing system that typically has many storage devices and delivers data at a constant rate to subscribers for the data. In this context, the phrase "constant rate" refers to delivering the appropriate amount of data to a subscriber over a period of time, such as a second.

SUMMARY OF THE INVENTION

A method and system is provided for tolerating component failure in a continuous media server system. The present invention guarantees data streams at a constant rate to subscribers for the data streams even when at least one component fails. The present invention is able to guarantee data streams at a constant rate by utilizing declustered mirroring and by reserving bandwidth for both normal mode processing and failure mode processing. The declustered mirroring of the present invention is performed by dividing the data to be stored in the continuous media server system into blocks. The blocks are then striped across the storage devices of the continuous media server system and each block is divided into a number of sub-blocks. The sub-blocks are in turn stored on separate storage devices. The present invention reserves bandwidth for both normal mode processing and failure mode processing. Since the present invention utilizes declustered mirroring, the bandwidth reserved for failure mode processing is reduced. Therefore, when a failure occurs, the bandwidth reserved for failure mode processing is utilized and the data streams to the subscribers are uninterrupted.

In accordance with a first aspect of the present invention, a system is provided for delivering data to consumers at a constant rate. In accordance with this system of the first aspect of the present invention, the system comprises a plurality of sequentially numbered storage devices and a send component. The plurality of sequentially numbered storage devices contain data wherein the data comprises blocks and sub-blocks and the data is striped across the storage devices. A block is divided into a predefined number of sub-blocks and sub-blocks for a block on a first storage device are stored on the predefined number of storage devices that numerically follow the first storage device. The send component is for sending the blocks from the storage devices to the consumers and when a storage device fails, for sending the sub-blocks from the predefined number of storage devices that numerically follow the storage device that failed.

In accordance with a second aspect of the present invention, a method is provided in a continuous media system for delivering data to consumers at a constant rate. The continuous media system has a plurality of numerically sequential storage devices for storing data. The storage devices have a primary portion and a secondary portion and the data comprises numerically sequential blocks that are striped across the storage devices. In accordance with this method of the second aspect of the present invention, the blocks are stored on the primary portion of the storage devices such that after storing a block a next numerically sequential block is stored on a next numerically sequential storage device, the blocks are divided into a predefined number of sub-blocks and for each block, the sub-blocks for the block are stored on the secondary portion of the predefined number of storage devices that numerically follow a storage device on which the block is stored.

BRIEF DESCRIPTION OF THE DRAWINGS

FIG. 3A is a partial plan view of a storage device of FIG. 2 of the preferred embodiment of the present invention.

FIG. 3B is a partial plan view of a storage device of FIG. 2 of an alternative embodiment of the present invention.

FIG. 3C is a diagram depicting an example of storing data utilizing declustered mirroring on the storage devices of the preferred embodiment of the present invention.

Figure 6:
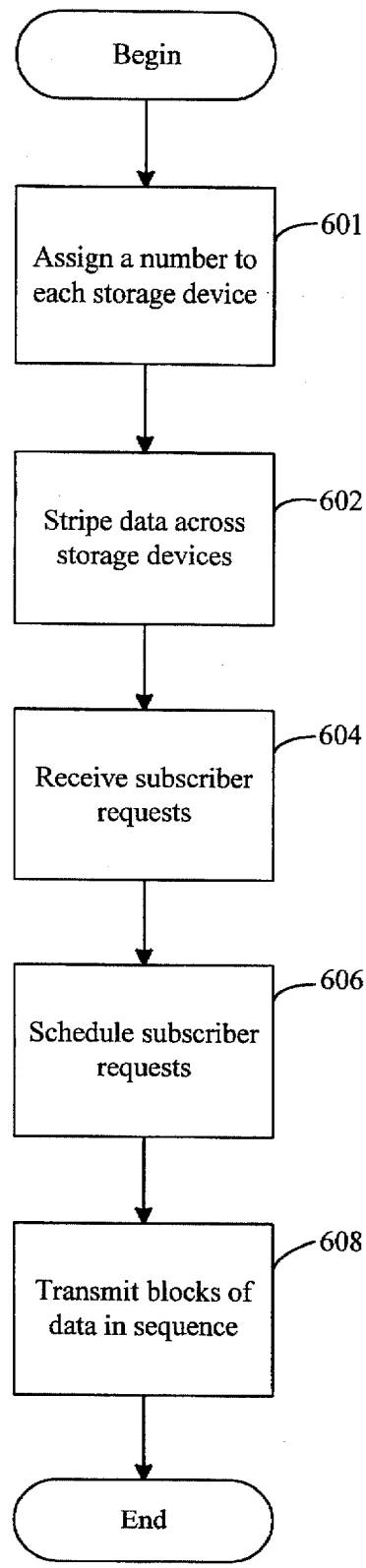

FIG. 6 depicts a high-level flow chart functionally illustrating the steps performed by the preferred embodiment of the present invention.

Figure 7:
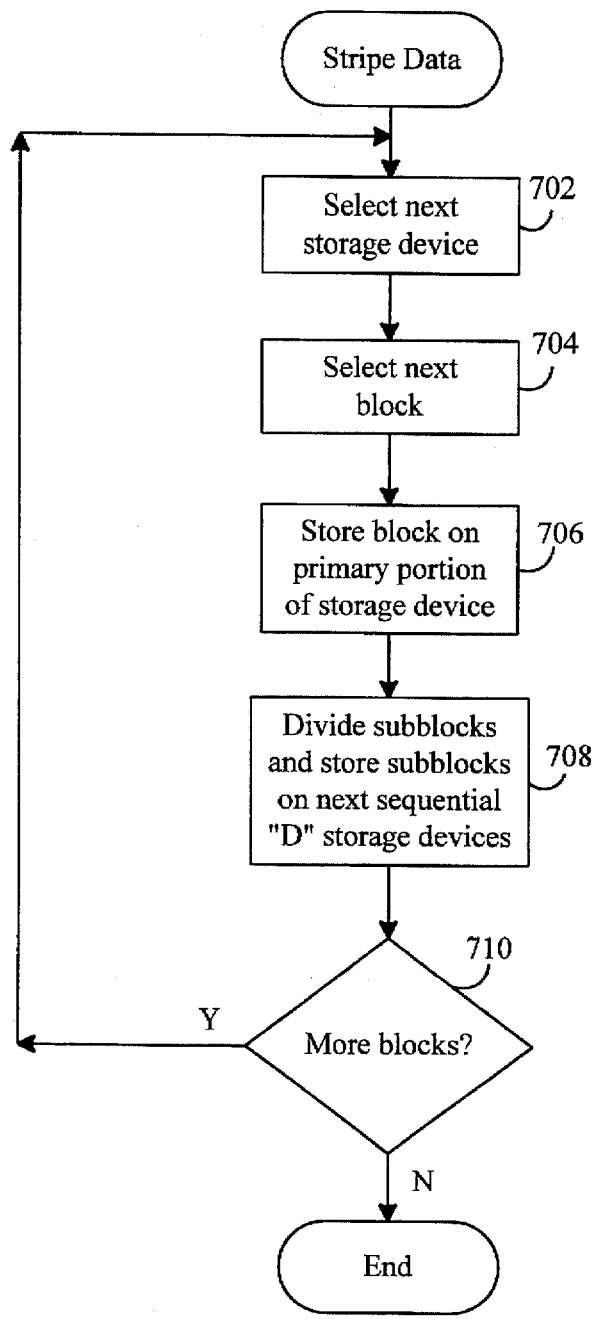

FIG. 7 depicts a flow chart of the steps performed by the preferred embodiment of the present invention for striping data across the storage devices.

Figure 8:
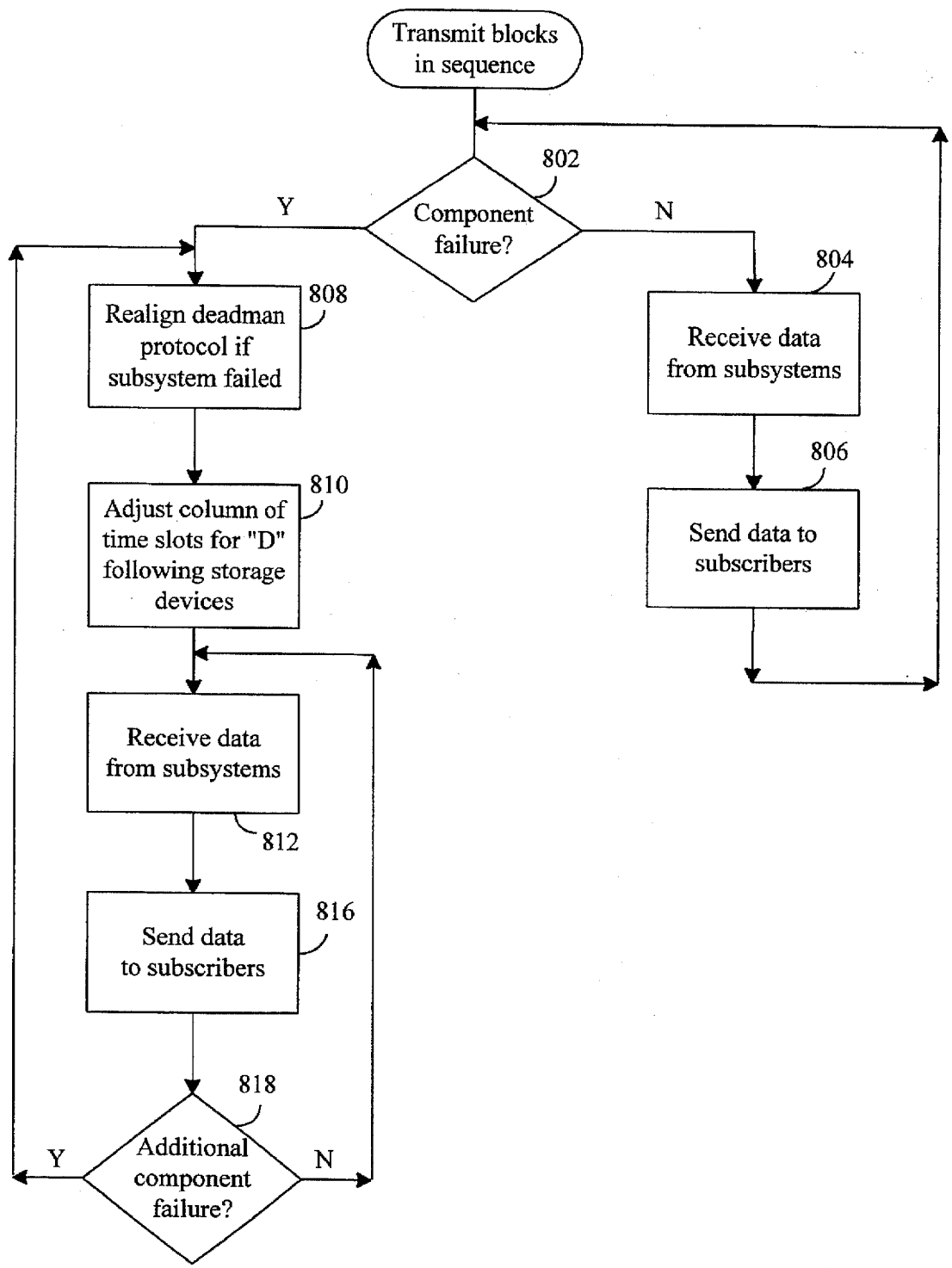

FIG. 8 depicts a flow chart of the steps performed by the preferred embodiment of the present invention when transmitting data in normal mode processing and failure mode processing.

DETAILED DESCRIPTION OF THE INVENTION

The preferred embodiment of the present invention provides a method and system for tolerating component failure in a continuous media server system by utilizing declustered mirroring and by reserving bandwidth for failure mode processing. By utilizing the preferred embodiment of the present invention, subscribers to the continuous media server system are guaranteed a data stream at a constant rate even when one or more components of the continuous media server system fail. One example of a continuous media server system is a video-on-demand system where subscribers request video image sequences, such as movies, and the video-on-demand system guarantees a data stream of the video image sequences to the subscribers at a constant rate. In addition, the video-on-demand system can send a data stream of audio data to subscribers. In a video-on-demand system, it is important to guarantee data flow at a constant rate. Otherwise, when a subscriber is viewing a movie and a failure occurs, the movie will appear to have an interruption. Thus, the preferred embodiment can also be thought of as preventing data flow interruptions.

In the video-on-demand system of the present invention, the video-on-demand system has a number of storage devices where the data for the video image sequences is stored as blocks that are striped across the storage devices. The term "striped" refers to storing blocks sequentially across the storage devices and when the last storage device is reached, wrapping around and storing the next block on the first storage device. The data stream is sent to subscribers by each disk sending a next sequential block of data to the subscriber, one at a time. As previously stated, the preferred embodiment of the present invention uses declustered mirroring in order to guarantee a data stream at a constant rate to a subscriber. In this context, "mirroring" refers to storing both a primary copy of a block of data and a secondary copy of a block of data where each copy of the block of data is stored on a separate storage device. The term "declustered" refers to dividing the secondary block of data into a number of sub-blocks where each sub-block is stored on a separate storage device. By placing the sub-blocks across many storage devices, when the storage device containing the primary block fails, the burden of transmitting the secondary block of data is shared among many storage devices, thereby lessening the effect of failure mode processing on each storage device. By using declustered mirroring, the preferred embodiment of the present invention guarantees that one component, either a storage device or a server of a storage device, can fail and the data stream is unaffected. A "server" of a storage device is responsible for managing the storage device. As will be described in further detail below, the preferred embodiment can tolerate more than one component failure under certain circumstances.

In addition to utilizing declustered mirroring, the preferred embodiment reserves bandwidth so as to be able to guarantee data streams to subscribers at a constant rate. The term "bandwidth" is intended to refer to the input/output capacity (for a fixed time frame) of storage devices that hold data for video image sequences. The video-on-demand system of the present invention will be described below relative to an implementation that concerns output bandwidth (i.e., reading data from storage devices holding video image sequences), but those skilled in the art will appreciate that the present invention may also be applied to input bandwidth as well (i.e., writing video image sequence data to storage devices). The preferred embodiment reserves bandwidth for both normal mode processing and failure mode processing. Normal mode processing refers to a mode of operation of the video-on-demand system wherein no component failures occur and failure mode processing refers to a mode of operation of the video-on-demand system wherein a component failure occurs. The preferred embodiment allocates a time slot to each subscriber request for video image sequences. This time slot is representative of a bandwidth unit (i.e., a unit of system bandwidth) of the video-on-demand system and is divided into two parts: a primary period and a secondary period. The primary period may be viewed as reserved bandwidth for normal mode processing and the secondary period can be thought of as reserved bandwidth for failure mode processing. The secondary period is typically not used for sending data in normal mode processing of the preferred embodiment. Instead, the secondary period is used in failure mode processing for sending sub-blocks of data in order to compensate for the failure of a component. Thus, by reserving bandwidth for failure mode processing, the data stream to a subscriber is unaffected when a failure occurs.

Further, the preferred embodiment of the present invention reduces the size of overall time slot necessary for normal mode and failure mode processing. That is, the preferred embodiment has a technique ("storage device segmentation") for reducing the amount of time that must be reserved for both normal mode processing and failure mode processing, thereby increasing the total bandwidth of the system. The preferred embodiment reduces the overall time slot by dividing the storage devices into a primary portion and a secondary portion. The primary portion of the storage device contains the primary blocks of data and the secondary portion of the storage device contains the sub-blocks of data. The preferred embodiment designates the primary portion as the faster region (typically the outer region) of the storage device and designates the secondary portion as the slower region (typically the inner region) of the storage device. Thus, the preferred embodiment takes advantage of the increased data transfer rates on the faster regions of a storage device. That is, by using storage device segmentation, the majority of data transferred during a time slot is retrieved from the outer region of the storage device that has a faster data transfer rate than the inner region of the storage device. This technique exploits the fact that storage devices, such as hard disks, typically have a platter with many concentric tracks. The outermost tracks are larger than the inner tracks and thus can store more data. In addition, the platter spins at a constant rate. Thus, in one revolution of the platter, the outermost tracks can transfer more data than the inner tracks. Therefore, the outermost tracks have a faster data transfer rate than the inner tracks. Although storage device segmentation has been described relative to a hard disk, one skilled in the art will appreciate that storage device segmentation can be used with any device having a faster region and a slower region.

In summary, the preferred embodiment of the present invention guarantees data streams to subscribers at a constant rate. In order to do this, the preferred embodiment stores data using declustered mirroring and reserves bandwidth up front for both normal mode processing and failure mode processing. Further, the preferred embodiment uses storage device segmentation to reduce the amount of bandwidth that must be reserved for normal mode processing and failure mode processing. By reducing the amount of bandwidth that must be reserved, the video-on-demand system is more efficient and can service more subscribers. Although the preferred embodiment of the present invention is described below with reference to a video-on-demand system, one skilled in the art will appreciate that the present invention can be used with any continuous media server system or, more generally, any system wherein a data stream must be delivered at a constant rate.

In describing the preferred embodiment of the present invention, the description is presented in three parts. First, a description of the hardware components is presented. Second, a description of the data structures used by the preferred embodiment is presented. Third, the step-by-step processing of the preferred embodiment is presented with accompanying flowcharts to illustrate the interrelationships between the hardware components and the data structures as well as to illustrate overall processing of the preferred embodiment of the present invention.

Figure 1:
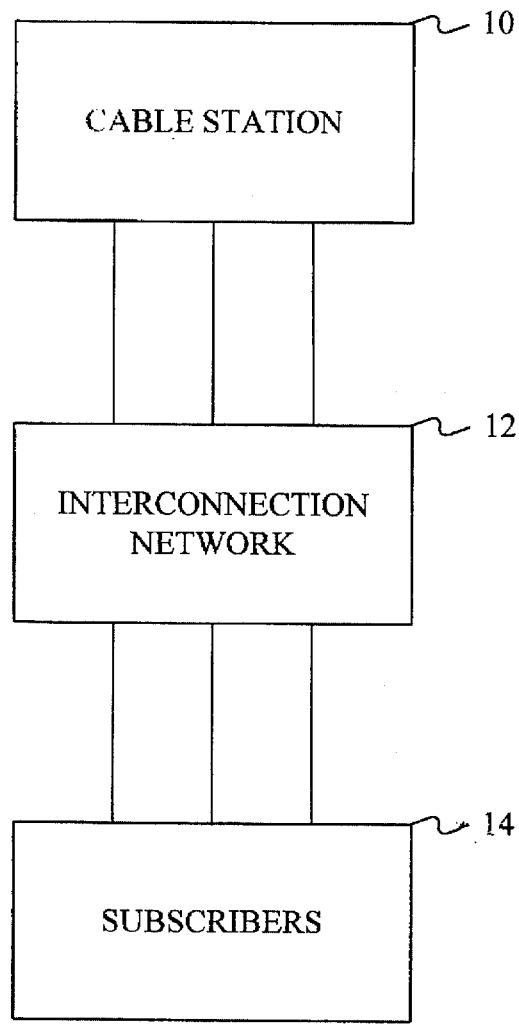
FIG. 1 is a block diagram of a video-on-demand system of a preferred embodiment of the present invention.

With respect to the hardware components, the preferred embodiment of the present invention is adapted for use in a video-on-demand server system like that shown in FIG. 1. The system depicted in FIG. 1 is a video-on-demand server system in which subscribers may request at any point in time to view particular video image sequences transmitted from the cable station 10. The cable station 10 transmits the data for the video image sequences over the interconnection network 12 to the subscribers 14. The interconnection network 12 may be any suitable interconnection mechanism, including an asynchronous transfer mode (ATM) network. Functionally, the interconnection network 12 acts like a crosspoint, banyan or other switch topology. The cable station 10 preferably makes available a large number of different video image sequences that may be transmitted to the subscribers 14 and viewed in real time. The data for the video image sequences may contain video data, audio data and other types of data, such as closed captioning data. The present invention may also be applied solely to audio data or other types of data sequences.

For such a video-on-demand server system, the choice of video image sequence viewed by a subscriber is not prescheduled. Viewing choices are scheduled upon subscriber demand. A subscriber need not choose a video image sequence that other subscribers are watching; rather, the subscriber may choose from any of the available video image sequences. Furthermore, each subscriber chooses when he wishes to start viewing a video image sequence. A number of different subscribers 14 may be concurrently viewing different portions of the same video image sequence. A subscriber may select where in a sequence he desires to start viewing and can stop watching a sequence before the entire sequence has been viewed.

Figure 2:
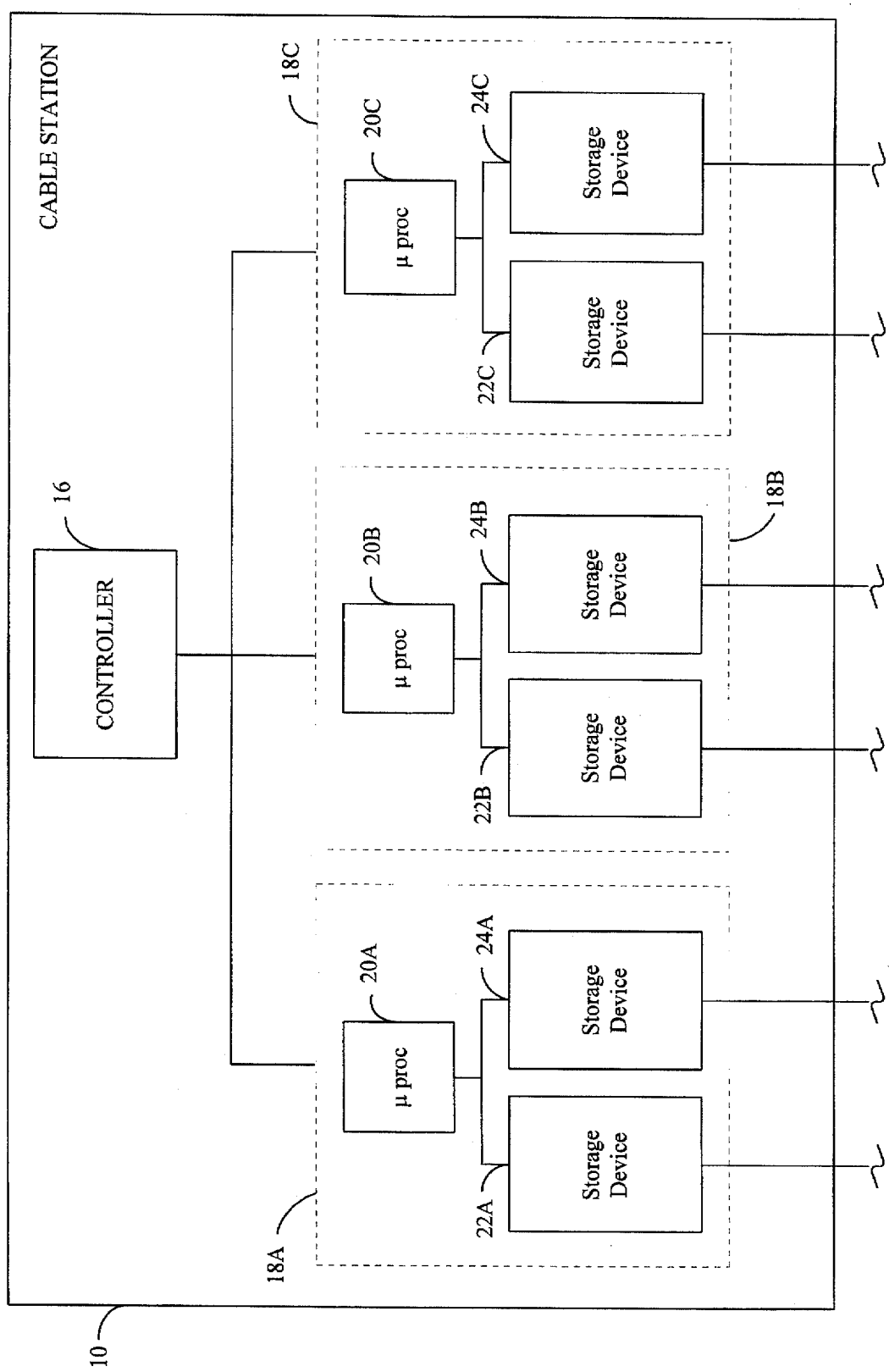
FIG. 2 is a more detailed block diagram of the cable station of FIG. 1.

FIG. 2 is a block diagram showing the cable station 10 in more detail. The cable station 10 is a video-on-demand server. The cable station 10 includes a controller 16 that is responsible for scheduling transmission of video image sequences to subscribers 14 (FIG. 1). The controller 16 controls several subsystems 18A, 18B, and 18C and is responsible for scheduling and directing output from the subsystems to subscribers 14. The controller may be duplicated to provide a backup controller that enhances the fault tolerance of the system. In addition, one skilled in the art will appreciate that the functioning of the controller can be distributed across the subsystems, thereby eliminating the need for a controller. Although only three subsystems are shown in FIG. 2, those skilled in the art will appreciate that, in most instances, it is more suitable to employ a larger number of subsystems. Only three subsystems are shown in FIG. 2 for purposes of simplicity and clarity.

Each subsystem 18A, 18B, and 18C includes a microprocessor 20A, 20B, and 20C that is responsible for controlling respective pairs of storage devices (22A, 24A), (22B, 24B) and (22C, 24C). The data for the video image sequences that are available to the subscribers 14 are stored on the storage devices 22A, 24A, 22B, 24B, 22C and 24C. Each subsystem 18A, 18B, and 18C need not include two storage devices, rather each subsystem may include only one storage device or may, alternatively, include more than two storage devices. The microprocessors 20A, 20B, and 20C are responsible for cooperating with the controller 16 to transmit the data for the video image sequences stored on the storage devices to the subscribers 14.

Storage devices 22A, 22B, 22C, 24A, 24B and 24C may be, for instance, magnetic disk drives or optical disk drives. Those skilled in the art will appreciate that any suitable storage device may be used for storing the data for the video image sequences. For instance, RAM, masked ROM, EPROM and flash EPROMs may be used to store the video image sequences in the present invention.

FIG. 3A depicts a portion of storage device 22A of FIG. 2 in more detail. Storage device 22A is described with reference to being a disk storage device. Although storage device 22A is depicted, the other storage devices 24A, 22B, 24B, 22C, and 24C are similar. Storage device 22A has an outer region 302 and an inner region 304. The outer region 302 is also known as the primary portion and the inner region 304 is also known as the secondary portion. As previously described, the data transfer rates for the outer region 302 far exceed those of the inner region 304. Also, as previously described, the video image sequences are divided into sequential blocks of data that are striped across the primary portions of the storage devices. Block size is variable, but typically a block includes 64 kilobytes to 4 megabytes of data. Block size is bounded by an upper limit that may not be exceeded. Striping the blocks of data refers to storing a first block of data on a first storage device and each sequentially following block of data is stored on the next sequential storage device. When reaching the last storage device, the preferred embodiment wraps around and stores the next block of data on the first storage device. This striping continues until all the blocks of data are stored across the storage devices. By storing the blocks on the primary portion of a storage device, it guarantees faster data transfer rates for the majority of the data that a storage device transfers.

After storing the primary blocks of data on the primary portions of the storage devices, the preferred embodiment of the present invention then stores data onto the secondary portions of the storage devices by utilizing declustered mirroring. Although the preferred embodiment is described as storing data on the secondary portions of the storage devices after storing data on the primary portions of the storage devices, one skilled in the art will appreciate that data can be stored on the primary portions after the secondary portions or data can be stored on the primary portions and the secondary portions simultaneously. The data on the secondary portion is used during failure mode processing. For each block of data on the primary portion of a storage device, the block of data is divided into "D" sub-blocks, where "D" refers to a declustering number. That is, the declustering number is the number of storage devices across which the sub-blocks are stored. As the declustering number is increased, the number of storage devices that are used for transmitting the sub-blocks of data during failure mode processing is increased, which lessens the burden of performing failure mode processing by each storage device. However, the greater the declustering number, the greater the ratio of network and other system overhead to the amount of data transferred. Although the preferred embodiment of the present invention uses a declustering number of 8, one skilled in the art will appreciate that other declustering numbers can be used by the present invention. Another benefit associated with using a higher declustering number is that as the declustering number is increased, the amount of bandwidth that is reserved for failure mode processing is reduced (i.e., the secondary period of the time slot). Therefore, since the primary period of the time slot transfers data at a faster rate than the secondary period of the time slot, a greater declustering number means less data is being transferred from the slower part of the storage device and thus a faster overall data transfer rate is realized. In turn, the faster the data transfer rate, the smaller the amount of bandwidth that must be reserved by the system and the more subscribers can be serviced by the system.

FIG. 3B depicts a more detailed diagram of storage device 22A of FIG. 2 in an alternative embodiment of the present invention. Storage device 22A is described with reference to being a disk storage device. In the alternative embodiment, the innermost region of the storage device 22A is an unused region 305. The unused region 305 has the slowest data transfer rate of the storage device 22A and is thus unused so as to increase the data transfer rate of the overall storage device. The outer region 302 and the inner region 307 are accordingly smaller in size.

FIG. 3C depicts an example of declustered mirroring of the preferred embodiment of the present invention. FIG. 3C depicts three storage devices 306, 308, 310 with each storage device having a primary portion 312, 316, 320 and a secondary portion 314, 318, 322. In this example, the video image sequences are comprised of three blocks of data, block A, block B, and block C which are stored on the primary portions 312, 316, 320 of the storage devices, respectively. In this example, the declustering number is 2 and, therefore, block A is divided into two sub-blocks with the first sub-block A1 being stored on the secondary portion 318 of storage device 308 and the second sub-block A2 being stored on the secondary portion 322 of storage device 310. Block B is divided into two sub-blocks, B1 and B2, which are stored on the secondary portions of storage devices 310, 306, respectively. Also, block C is divided into two sub-blocks, C1 and C2, which are stored on the secondary portions of storage devices 306, 308, respectively. Therefore, by striping the data on the primary portions of the storage devices and storing the sub-blocks on the secondary portions of the storage devices, if a failure occurs to storage device 308, storage device 310 and storage device 306 can each send sub-blocks B1 and B2 so that the data stream to the subscriber is not interrupted. Although a video image sequence has been described as comprising three blocks of data, one skilled in the art will appreciate that a video image sequence can comprise many blocks of data. In addition, although only one video image sequence has been described as being striped across the storage devices, one skilled in the art will appreciate that additional video image sequences can be stored in this manner by the present invention.

By utilizing declustered mirroring as shown in FIG. 3C, the video-on-demand system of the present invention can tolerate a storage device failure and continue operating in a seamless manner (i.e., without interruption). However, the preferred embodiment of the present invention can also tolerate the failure of a subsystem in a seamless manner without interrupting the data stream to the subscriber. With respect to transferring data, the preferred embodiment just treats the storage devices of the failed subsystem as having failed.

In order to tolerate the failure of a subsystem, the preferred embodiment of the present invention assigns numbers to the storage devices in a particular manner. The numbers are assigned by first sequentially numbering each subsystem from 1 to N. The number assigned to a subsystem can be expressed by the variable "i." Each storage device for a subsystem i is then assigned a number as follows: i, n+i, 2n+i ... until all storage devices are numbered. For example, when numbering the storage devices of FIG. 2, storage device 24A may be considered the first storage device, with storage device 24B being the second, storage device 24C being the third, storage device 22A being the fourth, storage device 22B being the fifth, and storage device 22C being the sixth. Therefore, if a declustering number of 2 is used with the system depicted in FIG. 2 and with the storage devices being numbered as previously described, the blocks on storage device 24A are divided into sub-blocks that are stored on storage device 24B and storage device 24C. Further, the blocks stored on storage device 22A are stored as sub-blocks on storage device 22B and storage device 22C. Therefore, if subsystem 18A were to fail, the storage devices of subsystems 18B and 18C are able to transmit the data that would have been transmitted by the storage devices of subsystem 18A and, therefore, the data stream to the subscribers is not interrupted.

Although the preferred embodiment of the present invention has been described as tolerating the failure of one storage device or one subsystem, one skilled in the art will appreciate that as the number of subsystems increases and the number of storage devices increases, a declustering number can be chosen so that more than one storage device or subsystem can fail without interrupting the data stream to the subscribers. That is, in the preferred embodiment of the present invention, if failed storage devices or subsystems are spread out with no less than "D" storage devices between the failed components, no interruption of data streams to subscribers occurs.

The declustered mirroring of the present invention has alternative embodiments of which two are described below. The first alternative embodiment spreads the burden of performing failure mode processing across more storage devices than the preferred embodiment, thereby lessening the effect of failure mode processing on any one storage device. The first alternative embodiment sequentially numbers each subsystem from 1 to N. Then, for each subsystem 1 to N, each storage device is sequentially numbered. For example, if subsystem 1 had three storage devices, these storage devices would be numbered 1, 2 and 3, respectively. The second subsystem would then number its storage devices starting with the number 4 and so on until all of the storage devices for each of the subsystems are numbered. After numbering all of the storage devices in this manner, the blocks for the lowest numbered storage device for a subsystem are stored on the secondary portion of the lowest numbered storage device for the "D" subsystems that follow the subsystem. The blocks on the primary portion of the next sequentially numbered storage device on the subsystem are split into D sub-blocks and are then stored on the next to lowest numbered storage device of the D+1 through 2D subsystems that follow the subsystem. Therefore, the blocks on the lowest numbered storage device would be stored across the D following subsystems on the lowest numbered storage device of each subsystem and the blocks on the next sequential storage device would be stored across the D+1 through 2D following subsystems on the next to lowest numbered storage device of each subsystem. This process is continued until all blocks on each storage device are stored as subblocks.

Figure 3D:
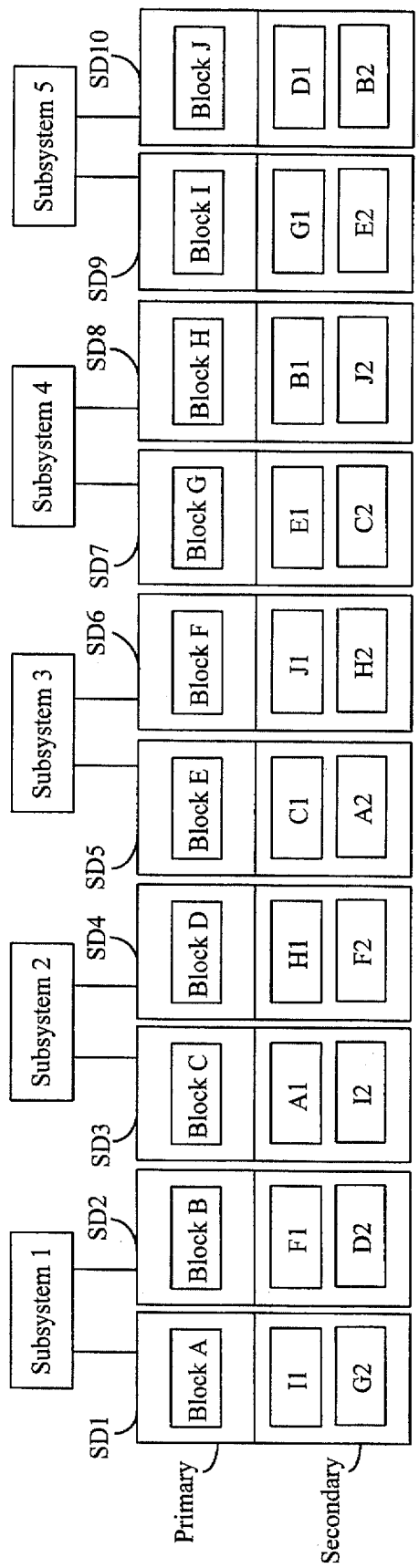
FIG. 3D is a diagram depicting an example of storing data utilizing a first alternative embodiment of the present invention.

The first alternative embodiment is perhaps best described by way of an example, which is provided in FIG. 3D. In FIG. 3D, there are five subsystems, subsystem 1, subsystem 2, subsystem 3, subsystem 4 and subsystem 5 with each subsystem having two storage devices, SD1, SD2, SD3, SD4, SD5, SD6, SD7, SD8, SD9 and SD10. Each storage device has a primary portion for storing blocks and a secondary portion for storing sub-blocks. In this example, a declustering number of two is used. As can be seen in FIG. 3D, block A, stored on the primary portion of SD1, is divided into two sub-blocks, A1 and A2, which are stored on the secondary portions of SD3 and SD5, respectively. Block B, stored on SD2, is divided into two sub-blocks, B1 and B2, which are stored on the secondary portions of storage devices SD8 and SD10, respectively. By utilizing the first alternative embodiment, the burden of performing failure mode processing is divided amongst many disks. For example, when subsystem 1 fails, the load for performing failure mode processing is equally distributed over subsystems 2, 3, 4 and 5, and storage devices SD3, SD5, SD8 and SD10.

The second alternative embodiment of declustered mirroring of the present invention reduces the vulnerability of the system to the failure of two or more components. As previously stated, the preferred embodiment can tolerate a second component failure if the second component is not within D storage devices of the component that failed. That is, the system cannot tolerate a component failure within the following "D" storage devices or the preceding "D" storage devices from the component that failed. The preferred embodiment cannot tolerate the failure of a component within D following storage devices since the blocks for a storage device are stored on the D following storage devices. The preferred embodiment cannot tolerate the failure of a second component within D preceding storage devices since a storage device stores sub-blocks for the D preceding storage devices. Therefore, the preferred embodiment is vulnerable to the failure of 2D storage devices.

Figure 3E:
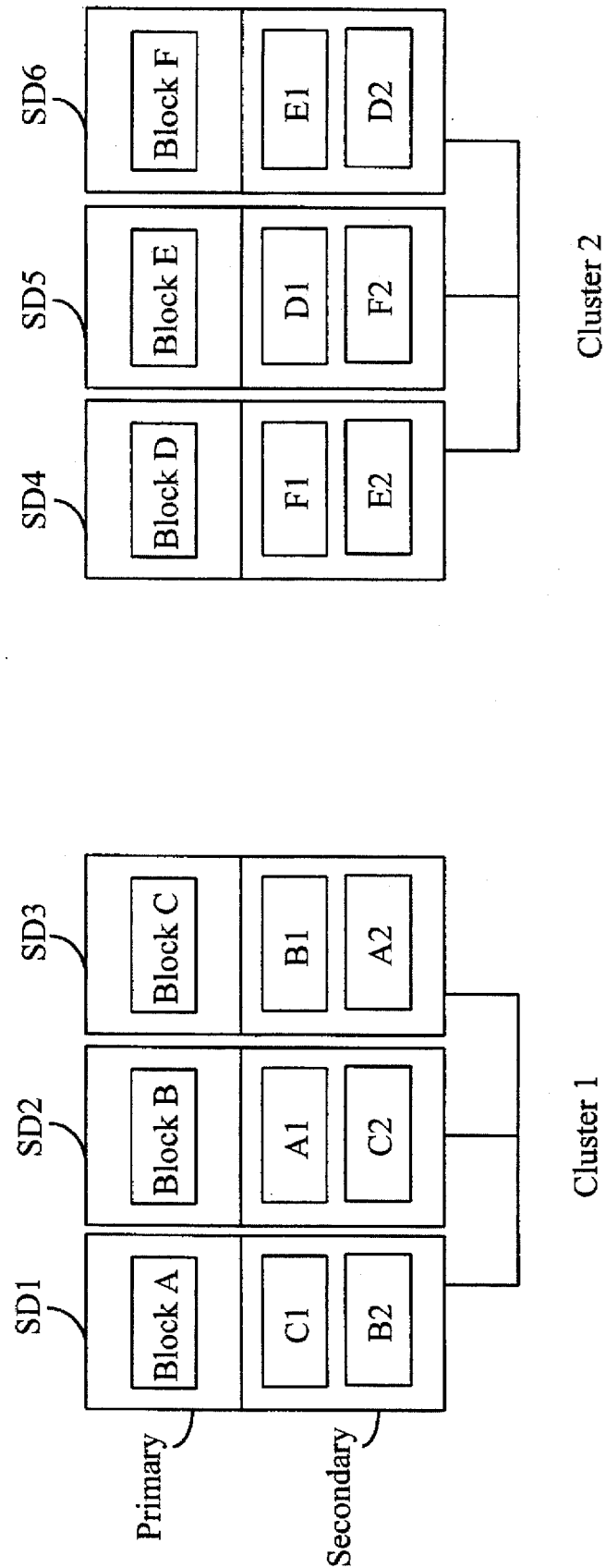
FIG. 3E is a diagram depicting an example of storing data utilizing a second alternative embodiment of the present invention.

The second alternative embodiment of declustered mirroring reduces the vulnerability of the system to the failure of two or more components by dividing the storage devices into groups of clusters. A "cluster" is a group of storage devices containing D+1 storage devices. For each block on a storage device in a cluster, the block is divided into D sub-blocks and is stored on the other storage devices within the cluster. As such, by utilizing the second alternative embodiment, if a storage device fails within a cluster, the system can continue operating without interruption even if a second storage device fails, as long as the second storage device is not within the cluster of the failed storage device. Therefore, the second alternative embodiment is vulnerable to the failure of D+1 storage devices and, as such, increases the tolerance of the system for multiple failures. An example of the second alternative embodiment is depicted in FIG. 3E.

In this figure, there are six storage devices, SD1, SD2, SD3, SD4, SD5, SD6 that are divided into two clusters, cluster 1 and cluster 2. The declustering number used in this example is 2. As can be seen from the figure, the block stored on the primary portion of a storage device within a cluster is divided into sub-blocks that are stored on the secondary portions of the other storage devices within the cluster. For example, block A is stored on the primary portion of SD1 and is divided into two sub-blocks, A1 and A2, which are stored on the secondary portions of SD2 and SD3, respectively. Similarly, block B stored on the primary portion of SD2, is divided into sub-blocks B1 and B2, which are stored on the secondary portions of SD3 and SD1, respectively. Furthermore, block C, stored on the primary portion of SD3, is divided into sub-blocks C1 and C2, which are stored on the secondary portions of SD1 and SD2, respectively.

Although two alternative embodiments have been described, one skilled in the art will appreciate that other numberings or groupings of the storage devices can be used by the present invention. Further, one skilled in the art will appreciate that both the blocks and sub-blocks can be stored in a different manner by the present invention.

With respect to the data structures used by the preferred embodiment, scheduling for each storage device is done on a column of time slots. Each column includes a number of time slots in a sequence that repeats. Each time slot is a bounded period of time that is sufficient for the storage device to output a block of data. One time slot from each column of time slots together comprise a bandwidth unit. A bandwidth unit is a unit of allocation of bandwidth of the video-on-demand system of the present invention and is used to transfer data. Each time slot in the bandwidth unit is associated with a different storage device that outputs a block of data of a video image sequence. Since the blocks of data are striped across the storage device, consecutive blocks of data are read from the predetermined sequence of storage devices during the sequence of time slots of the bandwidth unit. The time slots are generated by the controller 16 or other suitable mechanism (FIG. 2).

Figure 4:
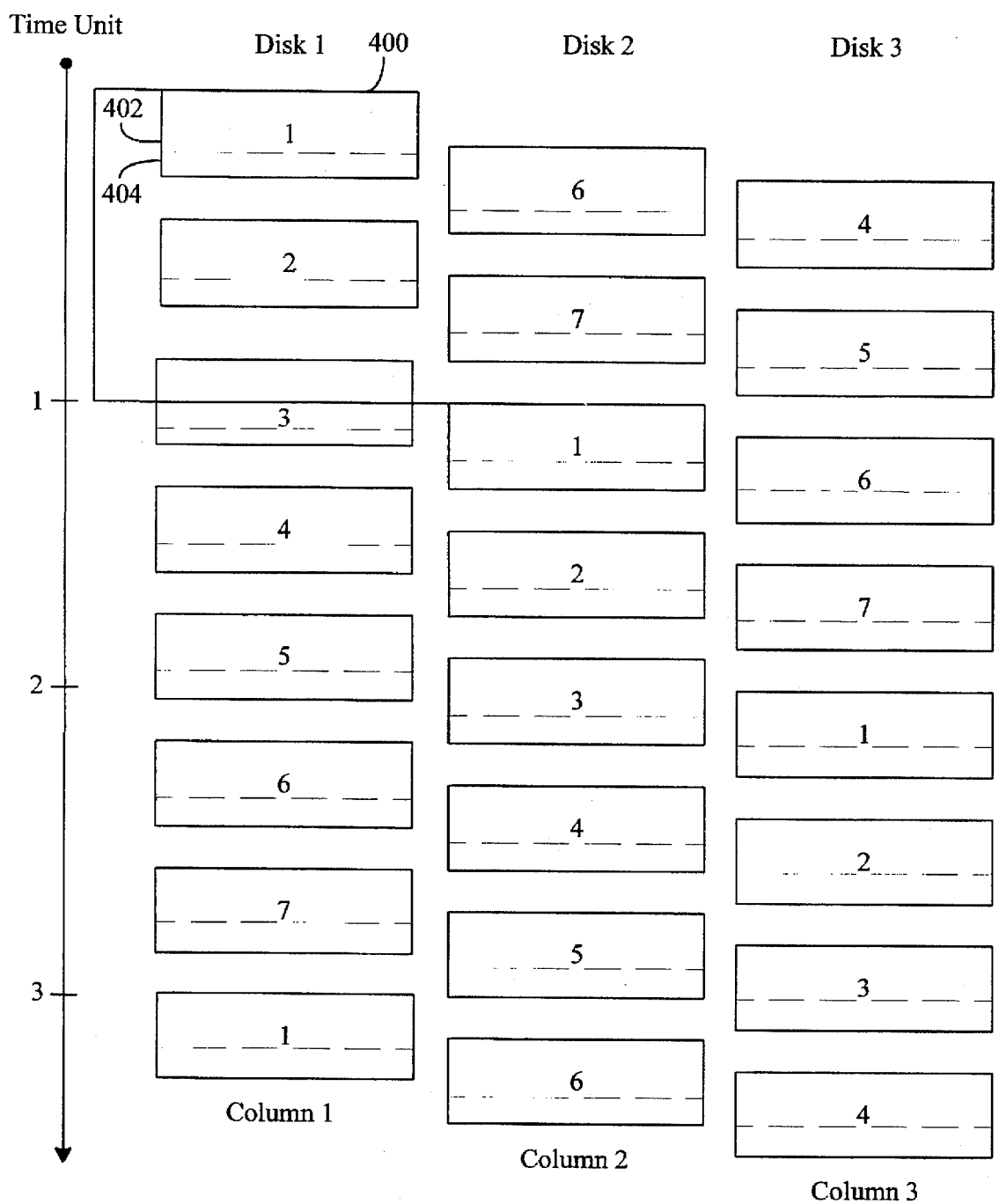
FIG. 4 is a diagram illustrating the scheduling of bandwidth in a three disk drive system in accordance with the preferred embodiment of the present invention.

The notions of a column of time slots and a bandwidth unit can perhaps best be explained by way of example. Subscribers are scheduled by bandwidth unit. In other words, they are granted the same numbered time slot in each column. FIG. 4 shows the scheduling of seven subscribers for three storage devices (e.g., disk 1, disk 2 and disk 3). The rectangles (e.g., 400) shown in FIG. 4 are time slots. Each time slot has a primary period (e.g., 402) and a secondary period (e.g., 404). The primary period of the time slots is for sending data from the primary portion of the storage device and the secondary portion of the time slot is for sending data from the secondary portion of the storage device. The numbers 1–7 in FIG. 4 correspond to the time slot in the respective columns 1, 2 and 3. Time slots of a common bandwidth unit all have the same number. Columns 1, 2 and 3 are all offset temporally relative (i.e., a time unit in FIG. 4) to each other, but each column has the same sequence of time slots. As can be seen in FIG. 4, disk drive 1 services each of the subscribers in sequence beginning with the subscriber who has been allocated logical unit of bandwidth 1. In the example of FIG. 4, bandwidth unit 1 includes the time slots labeled 1 in columns 1, 2 and 3. During the slot 1 of column 1, disk drive 1 begins outputting a block of data for a video image sequence to a first subscriber that has been assigned bandwidth unit 1. One time unit later, disk drive 2 outputs the next block of data to the first subscriber during time slot 1 of column 2. Further, at time unit 2, disk drive 3 outputs the next block of data for the video image sequence to the subscriber during time slot 1 of column 3. The predefined sequence of storage devices in this example is disk drive 1, disk drive 2 and disk drive 3, with the sequence wrapping back around to disk drive 1 from disk drive 3.

Figure 5:
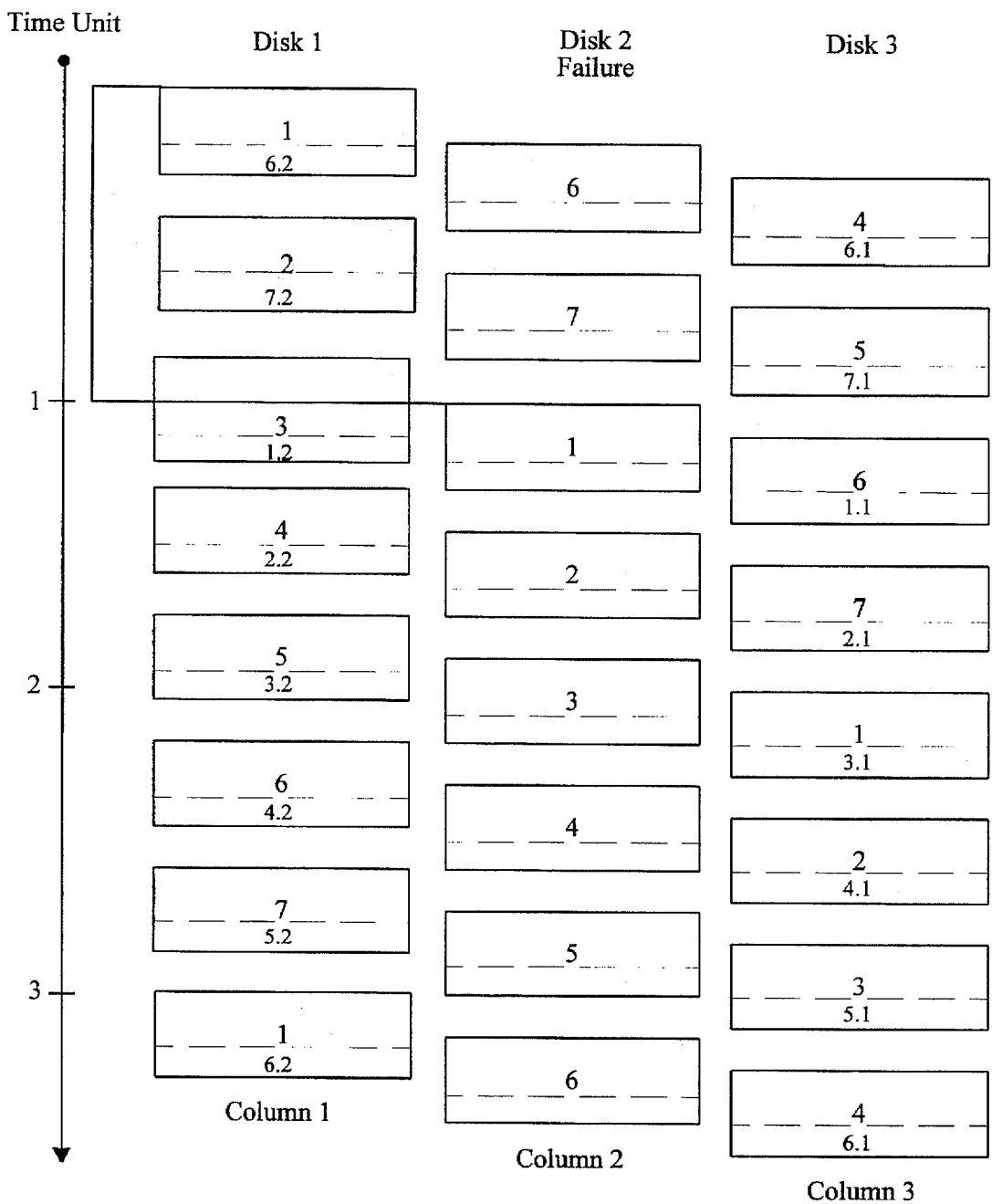
FIG. 5 is a diagram illustrating an example of the scheduling of bandwidth in the three disk drive system of FIG. 4 when a disk drive fails in accordance with the preferred embodiment of the present invention.

FIG. 5 depicts the columns of time slots of FIG. 4 after a failure of disk 2 has been detected. After a failure is detected by the preferred embodiment of the present invention, the blocks that would normally be sent by the storage device that failed are sent as sub-blocks by the "D" following disks. For example, FIG. 5 depicts an example of disk 2 failing with a declustering number of 2. That is, all of the blocks contained on the primary portion of disk 2 are stored as sub-blocks on the secondary portions of disk 1 and disk 3. During the primary period of the time slots for both disk 1 and disk 3, processing is performed as normal. That is, for example, disk 1 in the primary period of the first time slot sends a block destined for subscriber 1. However, after detecting a failure, the secondary periods of the time slots for both disk 1 and disk 3 are used for sending the sub-blocks that when combined comprise the block ("aggregate block") that should have been sent by the failed disk. For example, disk 2 during the first time slot was to send a block destined for subscriber 6. Since disk 2 has failed, during the secondary period of the first time slot of disk 1, disk 1 sends the first sub-block of the block destined for subscriber 6 (e.g., 6.0). In addition, during the secondary period of the first time slot of disk 3, disk 3 sends the second sub-block that is to be sent to subscriber 6 (e.g., 6.1). Therefore, using this method, subscriber 6 receives the block of data as an aggregate block without an interruption in the data stream. In other words, the data stream to all the subscribers scheduled for disk 2 will be uninterrupted when a failure occurs of disk 2. To the subscriber, no interruption in service is noticed and therefore the subscriber is unaware that a failure has occurred.

With respect to the step-by-step processing performed by the preferred embodiment, FIG. 6 depicts a flowchart functionally illustrating the steps performed by the preferred embodiment of the present invention. The preferred embodiment of the present invention is responsible for assigning numbers to the storage devices, storing data on the storage devices, receiving subscriber requests, scheduling the subscriber requests, and transmitting blocks of data in sequence to the subscribers during both normal mode processing and failure mode processing. The first step performed by the preferred embodiment of the present invention is to assign a number to each storage device (step 601). In this step, the preferred embodiment assigns a number to each storage device as previously described where a sequential number is assigned to one storage device of each subsystem. After assigning a sequential number to one storage device of each subsystem, the preferred embodiment wraps around and then assigns a sequential number to a second storage device of each subsystem. This process continues until all storage devices are assigned a number. After assigning a number to each storage device, the preferred embodiment stripes the data across the storage devices (step 602). In this step, the preferred embodiment of the present invention stripes all the blocks for one or more video images across the primary portions of the storage devices. In addition, the preferred embodiment divides each block into "D" sub-blocks and stores the sub-blocks for a particular block on the "D" numerically following storage devices. This step will be described in greater detail below. After striping the data across the storage devices, the preferred embodiment receives subscriber requests (step 604).

After receiving subscriber requests, the preferred embodiments schedules the subscriber requests (step 606). In this step, the preferred embodiment determines the storage device on which the initial block to be viewed in the video image sequence is stored for a particular subscriber. If the subscriber is viewing the video image sequence from the beginning of the sequence, the initial block is the first block in the sequence. However, where the subscriber desires to view the video image sequence beginning at some intermediate point, the initial block is the first block that the subscriber desires to view. Once the storage device that holds the initial block of the requested video image sequence to be viewed has been identified, the preferred embodiment of the present invention selects a bandwidth unit that may be used to transmit the video data of the requested video image sequence to the requesting subscriber. The preferred embodiment of the present invention selects the next bandwidth unit that is available (i.e., unallocated to a subscriber). The scheduling of subscriber requests and, more generally, the video-on-demand system of the present invention is more clearly described in U.S. patent application Ser. No. 08/159,188, entitled "Method and System for Scheduling the Transfer of Data Sequences," which is hereby incorporated by reference. Alternatively, the preferred embodiment of the present invention may schedule subscriber requests as described in U.S. patent application Ser. No. 08/349,889, entitled "Method and System for Scheduling the Transfer of Data Sequences Utilizing an Anticlustering Scheduling Algorithm," which is hereby incorporated by reference. After scheduling subscriber requests, the preferred embodiment of the present invention transmits blocks of data in sequence to the subscribers (step 608). In this step, the preferred embodiment accesses the columns of time slots and transmits the blocks of data to the subscribers. In addition, if a component fails, the preferred embodiment switches to failure mode and continues transmitting blocks of data in sequence to the subscribers without the subscribers noticing a disruption in the data stream. With regard to a particular video image sequence, the blocks of data are transmitted until either the end of the video image sequence or until the subscriber requests the video image sequence to stop. This step is described in more detail below. Although the steps of FIG. 6 have been described with a specific order, one skilled in the art will appreciate that two or more of the steps may be performed concurrently or in a different order. For example, while the preferred embodiment is transmitting blocks of data in sequence, the preferred embodiment can receive more subscriber requests and schedule those subscriber requests.

FIG. 7 depicts a flowchart of the steps performed by the preferred embodiment of the present invention when striping data for a video image across the storage devices. Although the striping of data is described for only one video image, one skilled in the art will appreciate that the present invention can stripe many video images across the storage devices. The first step performed by the preferred embodiment when striping data is to select the next storage device, starting with an arbitrary storage device (step 702). In this step, the preferred embodiment selects the next storage device for storing a block of data or upon the first invocation of this step, the preferred embodiment selects an arbitrary storage device. When the preferred embodiment selects the next storage device, if the last storage device is encountered, the preferred embodiment wraps around and selects the first storage device. Alternatively, instead of selecting an arbitrary storage device, one skilled in the art will appreciate that the storage device that is least full may be initially selected by the present invention. After selecting the next storage device, the preferred embodiment selects the next block of data, starting with the first (step 704). That is, the preferred embodiment selects the next block of data from the video image to be stored or the first block of data if this step is being invoked for the first time. After selecting the next block of data, the preferred embodiment stores the selected block on the primary portion of the selected storage device (step 706). After storing the block of data on the primary portion of the storage device, the preferred embodiment divides the block into "D" sub-blocks and stores the sub-blocks on the secondary portion of the next sequential "D" storage devices (step 708). In this step, after dividing the block into sub-blocks, the sub-block corresponding to the first part of the block is stored on the next sequential storage device and each subsequent sub-block is stored on a sequentially following storage device. After dividing and storing the sub-blocks on the secondary portions of the storage devices, the preferred embodiment determines whether there are more blocks in the video image to be stored (step 710). If there are more blocks to be stored, the preferred embodiment continues to step 702 wherein the preferred embodiment selects the next sequential storage device. However, if all of the blocks have been stored, processing ends.

FIG. 8 depicts a flowchart of the steps performed by the preferred embodiment of the present invention when transmitting blocks in sequence to subscribers. Steps 804–806 reflect the normal mode processing performed by the preferred embodiment of the present invention. Steps 808–818 describe the failure mode processing performed by the preferred embodiment of the present invention. The first step performed by the preferred embodiment is to determine if a component has failed (step 802). In this step, the system detects whether a subsystem has failed or a storage device has failed. The system detects the failure of a subsystem by using a "deadman protocol." In utilizing the deadman protocol, each subsystem sends a ping (i.e., a message) after a predetermined amount of time to the sequentially preceding subsystem and listens to the subsystem that sequentially follows the subsystem. If a subsystem has not received a ping within a predetermined period of time from the sequentially following subsystem, a time-out occurs. Upon the time-out occurring, the subsystem signals the controller and the controller sends a ping to the sequentially following subsystem. If the sequentially following subsystem does not respond to the ping from the controller, the controller determines that the sequentially following subsystem has failed. The detection of a storage device failure occurs when a subsystem detects that one of its storage devices is no longer sending data. After detecting that the storage device is no longer sending data, the subsystem sends a message to the controller indicating the failure of the storage device. If the preferred embodiment does not detect a component failure, processing continues to step 804 and the preferred embodiment performs normal processing.

In performing normal processing, the preferred embodiment receives data from the subsystems (step 804). In this step, the preferred embodiment accesses the column of time slots and processes subscriber requests for the primary period of each time slot. In effect, each storage device marches down its column of time slots and processes each subscriber request. In processing subscriber requests, the storage devices send the appropriate block of data for a particular subscriber. After receiving the data from the storage devices, the preferred embodiment sends the data to the subscribers (step 806). In this step, the system determines the subscriber for each block of data received and sends the blocks to the appropriate subscriber via the interconnection network.

If the preferred embodiment detects a component failure, the preferred embodiment realigns the deadman protocol if the component failure detected is a subsystem failure (step 808). When the preferred embodiment realigns the deadman protocol, it indicates to the immediately following subsystem to send the ping to the immediately preceding subsystem of the failed subsystem. In addition, the immediately preceding subsystem listens for the ping of the immediately following subsystem. After realigning the deadman protocol, the preferred embodiment adjusts the column of time slots for each "D" following storage device (step 810). This is done by inserting entries into the secondary period of each time slot for each "D" following storage device. The entry in each secondary period corresponds to the entry in the primary period of the same time unit for the storage device that failed. For example, if in time slot one, the failed storage device were to send a particular block to subscriber 6, the "D" following storage devices send the corresponding sub-block of subscriber 6 during the secondary period of the time slot that they are currently processing when the failed storage device would have been processing the first time slot. In this step, when a subsystem fails, the storage devices for the failed subsystem are treated as having failed.

After adjusting the time slots, the preferred embodiment receives data from the subsystems (step 812). In this step, the preferred embodiment receives both blocks of data from the primary portion of the storage devices as well as sub-blocks from the secondary portion of the storage devices. After receiving data from the subsystems, the preferred embodiment sends the data to the subscribers (step 816). The processing of this step is similar to that as described relative to step 806 above, except that upon receiving sub-blocks, the subscribers combine the sub-blocks into aggregate blocks. After sending data to the subscribers, the system determines if there is an additional component failure (step 818). The processing of this step is similar to that as described relative to step 802 above. If an additional component failure is detected, processing continues to step 808. However, if an additional component failure is not detected, processing continues to step 812 and the preferred embodiment continues to operate in failure mode. It should be noted that the preferred embodiment operates in failure mode until a system administrator can replace the component that has failed. However, until that time, the video-on-demand system of the present invention continues to deliver data streams to subscribers without the subscribers noticing any interruption in the data streams. Therefore, the preferred embodiment of the present invention sends data to subscribers at a constant rate and can thus guarantee the constant rate in the face of at least one component failure.

While the present invention has been described with reference to a preferred embodiment thereof, those skilled in the art will appreciate that various changes in form and detail may be made without departing from the spirit and scope of the present invention as defined in the appended claims. For instance, other storage media may be used and different quantities of storage media may be used. In addition, different declustering numbers may be used and the ordering of the storage devices may differ.

We claim:

1. A continuous media server system having a consumer for consuming data at a given amount per time interval, the continuous media server system for delivering data to the consumer at the given amount per the time interval, comprising:

a plurality of storage devices containing data, wherein the data comprises blocks and sub-blocks, wherein a block is divided into a clustering number of sub-blocks, wherein the clustering number is a number greater than one, and wherein sub-blocks for a block on a first storage device are stored on the clustering number of storage devices that follow the first storage device; and a send component for sending a sequence of the data to the consumer at the given amount per the time interval, wherein the sequence comprises the blocks and when a failure occurs such that a block cannot be sent to the consumer, the sequence comprises the sub-blocks for the block from the clustering number of storage devices that follow the storage device that stores the block to ensure that the sequence of data to the consumer is uninterrupted.

2. The continuous media server system of claim 1 wherein the storage devices are sequential and the sub-blocks are striped across the storage devices.

3. The continuous media server system of claim 1 wherein the storage devices comprise a faster region and a slower region such that the blocks of data are stored on the faster region of the storage device and the sub-blocks of data are stored on the slower region of the storage devices.

4. The continuous media server system of claim 1 wherein the storage devices comprise a fast region, a medium speed region and an unused region such that the blocks of data are stored on the fast region of the storage device, the sub-blocks of data are stored on the medium speed region of the storage device and the unused region comprises a portion of the storage device that has a slower data transfer rate than the fast region and the medium speed region.

5. The continuous media server system of claim 1, further including a reserver component for reserving bandwidth for sending both sub-blocks and blocks to the consumers, wherein bandwidth is output capacity of the system, and wherein the send component sends the blocks from the storage devices to the consumers utilizing the reserved bandwidth and when a storage device fails, the send component sends the sub-blocks utilizing the reserved bandwidth.

6. The continuous media server system of claim 1, further comprising a plurality of subsystems for managing the storage devices and including a means for sending the sub-blocks from the clustering number of storage devices that follow a second storage device when a subsystem that manages the second storage device fails.

7. The continuous media server system of claim 1, further comprising an ordering of subsystems for managing the storage devices and a numbering component for performing a sequence of assigning sequential numbers to the storage devices wherein one storage device is assigned a sequential number from each ordered subsystem and for repeating the sequence until all storage devices are assigned a sequential number.

8. The continuous media server system of claim 1 wherein the system is a video-on-demand system and wherein the data is video image sequences.

9. The continuous media server system of claim 1 wherein the sequence of the data is a stream of the data and wherein the send component sends the stream of the data to the consumer at a constant rate over a period of time.

10. In a video-demand system having a consumer for consuming data at a given amount per time interval, the video-on-demand system for delivering data to the consumer at the given amount per the time interval, the video-on-demand system having a plurality of sequential storage devices for storing data, wherein the data comprises video image sequences having sequential blocks, a method comprising the steps of:

under the control of the video-on-demand system,
storing the blocks on the storage devices such that after storing a block a next sequential block is stored on a next sequential storage device;
dividing the blocks into a clustering number of sub-blocks, wherein the clustering number is a number greater than one; and
for each block,
storing sub-blocks for the block on the clustering number of storage devices that sequentially follow a storage device on which the block is stored.

11. The method of claim 10 wherein the storage devices comprise a faster region and a slower region, wherein the step of storing the blocks includes the step of storing the blocks on the faster region of the storage devices such that after storing a block, a next sequential block is stored on a next sequential storage device, and wherein the step of storing sub-blocks includes the step of storing sub-blocks for the block on the slower region of the clustering number of storage devices that sequentially follow the storage device on which the block is stored.

12. The method of claim 11, further including the step of providing an unused region to the storage devices that is a portion of the storage device having a slowest data transfer rate.

13. The method of claim 10 wherein the storage devices are managed by sequential subsystems and wherein the method further includes the steps of:
performing a sequence of assigning sequential numbers to the storage devices wherein one storage device is assigned a sequential number from each sequential subsystem; and
repeating the sequence until all storage devices are assigned a sequential number.

14. In an on-demand media server system having a consumer for consuming data at a given amount per time interval, a plurality of components and a controller, the components comprising a sequence of storage devices for storing blocks of data and sub-blocks of data and a plurality of subsystems for managing the storage devices, the controller for managing the subsystems, wherein the storage devices comprise a primary portion for storing the blocks and a secondary portion for storing the sub-blocks, wherein the blocks are sequential and each block is divided into a clustering number of sub-blocks, wherein the clustering number is a number greater than one, a method for guaranteeing data delivery to the consumer at the given amount per the time interval, comprising the steps of:
under the control of the controller of the on-demand media server system,
receiving blocks from the primary portion of the storage devices;
sending the received blocks to the consumers;
determining when a component has failed; and
when it is determined that a component has failed,
receiving sub-blocks from the secondary portion of the clustering number of storage devices that sequentially follow the component that failed;
combining the received sub-blocks to create an aggregate block; and
sending the aggregate block to the consumers.

15. The method of claim 14 wherein the storage devices comprise a faster region and a slower region, wherein the primary portion of the storage devices is located on the faster region and the secondary portion of the storage devices is located on the slower region, wherein the step of receiving blocks further includes the step of receiving blocks from the primary portion on the faster region of the storage devices, and wherein the step of receiving sub-blocks further includes the step of receiving sub-blocks from the secondary portion on the slower region of the clustering number of storage devices that sequentially follow the component that failed.

16. In a continuous media server system having a consumer for consuming data at a given amount per time interval, and a plurality of sequential storage devices for storing sequential blocks of data and sub-blocks of data, a method for guaranteeing data delivery to the consumer at the given amount per the time interval, comprising the steps of:

under the control of the continuous media server system,
striping the blocks sequentially across the storage devices;
for each block,
dividing the block into a clustering number of sub-blocks, wherein the clustering number is a number greater than one;
storing the sub-blocks on the clustering number of storage devices that sequentially follow a storage device containing the block;
providing the storage devices with a time slot for sending data, wherein the time slot has a primary period and a secondary period;
during the primary period of the time slot,
sending blocks from storage devices to consumers; determining whether a storage device has failed; and when it is determined that a storage device has failed,
sending sub-blocks from the clustering number of storage devices that sequentially follow the storage device that failed during the secondary period of the time slot.

17. The method of claim 16 wherein the storage devices comprise a faster region and a slower region, wherein the blocks are stored on the faster region and the sub-blocks are stored on the slower region, wherein the step of sending blocks includes the step of sending blocks from the faster region of the storage devices to consumers and wherein the step of sending sub-blocks includes the step of sending sub-blocks from the slower region of the clustering number of storage devices that sequentially follow the storage device that failed.

18. The method of claim 16 wherein the storage devices are managed by sequential subsystems and wherein the method further includes the steps of:

performing a sequence of assigning sequential numbers to the storage devices wherein one storage device is assigned a sequential number from each sequential subsystem; and repeating the sequence until all storage devices are assigned a sequential number.

19. In a data processing system having a consumer for consuming data at a given amount per time interval, a method for guaranteeing data delivery to the consumer at the given amount per the time interval, comprising the steps of:

providing a continuous media server system to the data processing system for guaranteeing data delivery to the consumer at the given amount per the time interval, the continuous media server system comprising a plurality of sequential storage devices for storing data and a plurality of sequential servers for managing the storage devices, wherein the data comprises sequential blocks;

storing the blocks on the storage devices by the continuous media server system such that after storing a block a next sequential block is stored on a next sequential storage device;

dividing the blocks into a clustering number of sub-blocks by the continuous media server system, wherein the clustering number is a number greater than one; and storing sub-blocks for a block on a storage device that is managed by a server on a storage device of the clustering number of servers that follow the server by the continuous media server system.

20. The method of claim 19, wherein the step of storing sub-blocks includes the step of storing sub-blocks for a second block on a second storage device that is managed by the server on a storage device of the second clustering number of servers that follow the first clustering number of servers.

21. In a continuous media server system having a consumer for consuming data at a given amount per time interval, and a plurality of sequential storage devices for storing data that are grouped into clusters of storage devices, wherein the data comprises sequential blocks, a method for guaranteeing data delivery to the consumer at the given amount per the time interval, comprising the steps of:

under the control of the continuous media server system,
storing the blocks on the storage devices such that after storing a block a next sequential block is stored on a next sequential storage device;
dividing the blocks into a clustering number of sub-blocks, wherein the clustering number is a number greater than one; and
storing sub-blocks for a block on a storage device within a cluster on a clustering number of storage devices within the cluster.

22. In a video-on-demand system having a consumer for consuming data at a constant rate over a period of time, and a plurality of sequential storage devices for storing data, the data comprising video image sequences having sequential blocks, a method for guaranteeing a stream of data to the consumer at the constant rate, comprising the steps of:

under the control of the video-on-demand system,
storing the blocks on the storage devices such that after storing a block a next sequential block is stored on a next sequential storage device;
dividing the blocks into a clustering number of sub-blocks, wherein the clustering number is a number greater than one;
storing the sub-blocks for each block on the clustering number of storage devices that follow the storage device on which the block is stored;
receiving a request for a stream of the data from the consumer;
determining whether a storage device has failed;
when it is determined that a storage device has failed, for each block,
if the block is not located on the storage device that failed,
sending the block to the consumer; and if the block is located on the storage device that failed,
sending the sub-blocks for the block to the consumer from the clustering number of storage devices that follow the storage device that failed to ensure that the stream of data is uninterrupted due to the storage device failure; and
when it is determined that a storage device has not failed,
for each block,
sending the block to the consumer.

23. A computer-readable media whose contents cause a continuous media server system to become fault tolerant, the continuous media server system having a consumer for consuming data at a constant rate over a period of time and a plurality of sequential storage devices for storing data, the data comprising blocks, the continuous media media server system for sending data to the consumer at the constant rate over the period of time, by performing the steps of:

> storing the blocks on the storage devices of the continuous media server system such that after storing a block, a next sequential block is stored on a next sequential storage device;
>
> dividing the blocks into a clustering number of sub-blocks, the clustering number is a number greater than one;
>
> storing the sub-blocks for each block on the storage devices of the continuous media server system that sequentially follow the storage device on which the block is stored;
>
> receiving a request for the data; and
>
> for each block,
>> determining if the block is located on a storage device that failed;
>>
>> if it is determined that the block is located on a storage device that has not failed,
>>> sending the block to the consumer; and
>>
>> if it is determined that the block is located on a storage device that has failed,
>>> sending the sub-blocks for the block to the consumer to ensure that the constant rate at which the data is sent to the consumer does not change due to the failure of the storage device.

* * * * *